No. 753,768. PATENTED MAR. 1, 1904.
E. J. WANG.
HARVESTING MACHINE.
APPLICATION FILED JULY 8, 1902.
NO MODEL. 2 SHEETS—SHEET 1.
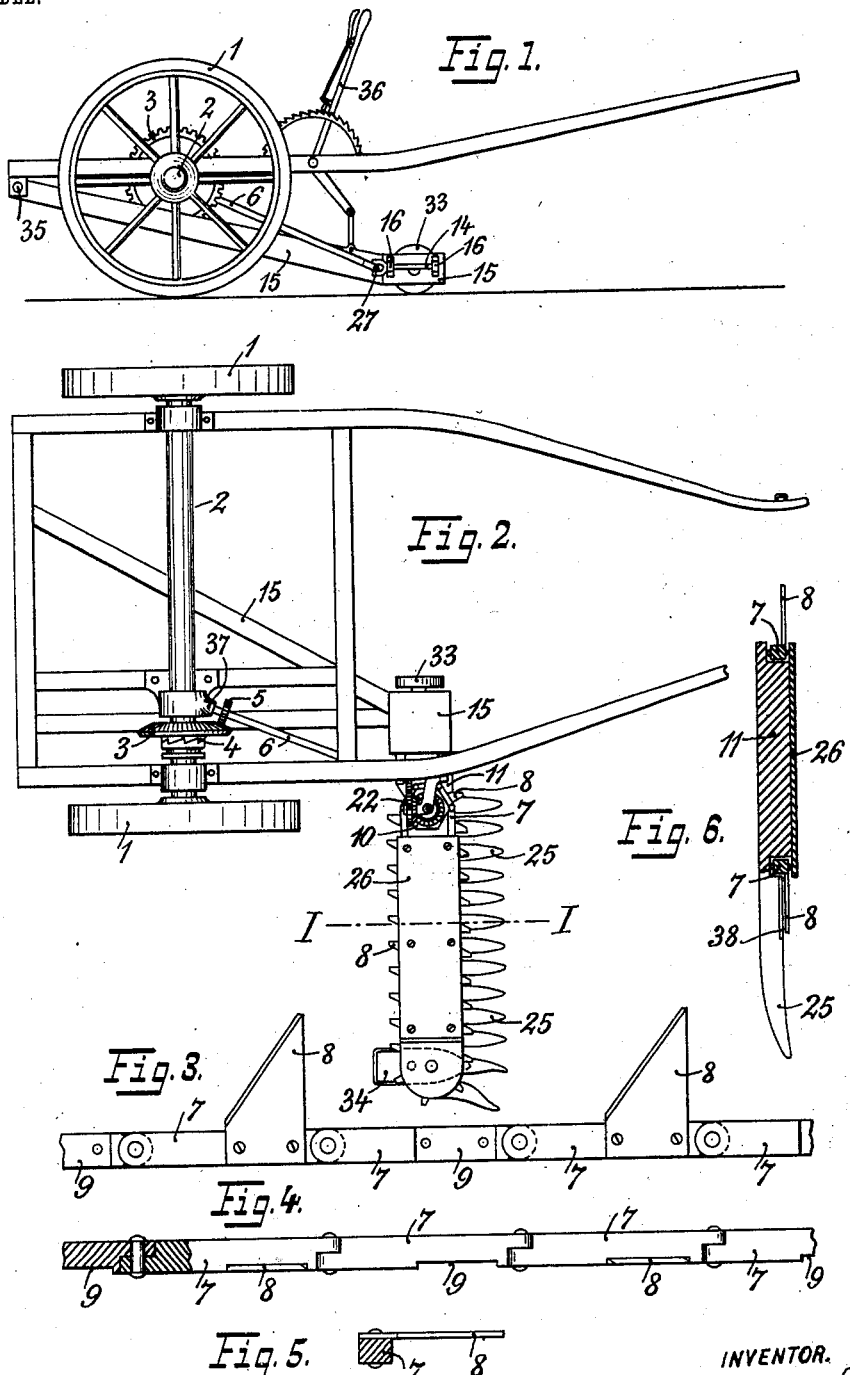

No. 753,768. PATENTED MAR. 1, 1904.
E. J. WANG.
HARVESTING MACHINE.
APPLICATION FILED JULY 8, 1902.
NO MODEL. 2 SHEETS—SHEET 2.
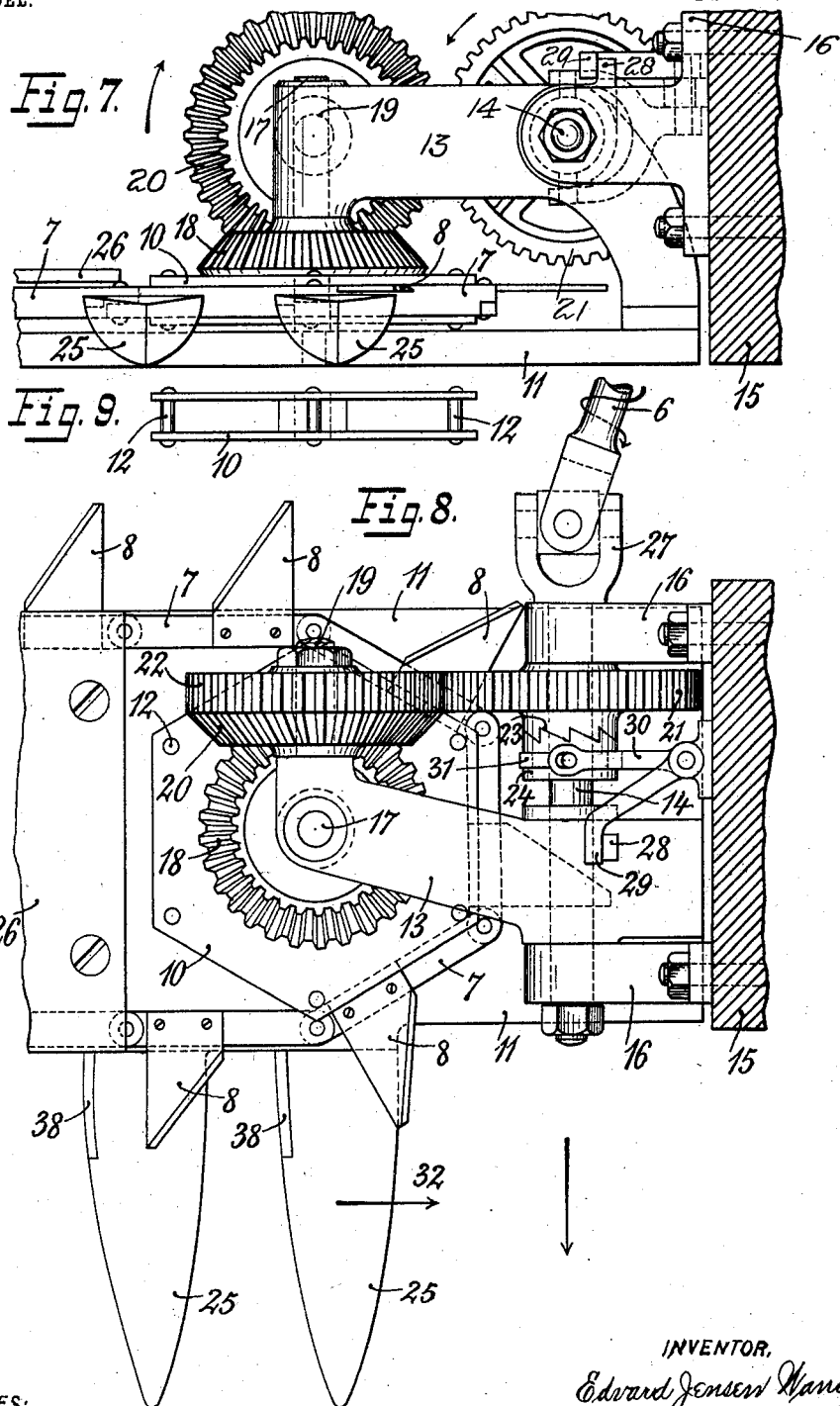

No. 753,768. Patented March 1, 1904.

UNITED STATES PATENT OFFICE.

EDVARD JENSEN WANG, OF CHRISTIANIA, NORWAY.

HARVESTING-MACHINE.

SPECIFICATION forming part of Letters Patent No. 753,768, dated March 1, 1904.

Application filed July 8, 1902. Serial No. 114,810. (No model.)

*To all whom it may concern:*

Be it known that I, EDVARD JENSEN WANG, a subject of the King of Sweden and Norway, and a resident of Christiania, Norway, have invented certain new and useful Improvements in Harvesting-Machines, of which the following is a specification.

My invention relates to that form of mower in which an endless moving knife-chain coöperates with a finger-bar; and the invention relates to certain details of construction and arrangement of parts hereinafter described, and particularly pointed out in the claims.

The invention is illustrated in the accompanying drawings, in which—

Figure 1 is a side elevation with parts omitted. Fig. 2 is a plan view. Fig. 3 is a plan view of the knife-chain. Fig. 4 is a side view thereof. Fig. 5 is a sectional view of the same. Fig. 6 is a cross-section on line I I of Fig. 2, drawn to an enlarged scale. Fig. 7 is an elevation of the mechanism for driving the chain. Fig. 8 is a plan view of the same. Fig. 9 is a side view of one of the chain-carrying drums or wheels.

Referring by reference-numerals to the drawings, the driving-wheels of the machine are designated at 1, connected in the usual manner with shaft 2, so that it is rotated only on the forward movement of the wheels. On the axle 2 is secured a bevel-gear 3, preferably caused to rotate with the axle by a clutch member 4. The bevel-gear 3 meshes with a gear 5, fast on a shaft 6, by which movement is transmitted to the knife-chain, as hereinafter described. The chain-links are indicated at 7, and to each is secured a knife-blade 8, having an inclined cutting edge on one side, the knives being seated in recesses 9 in the links 7. The chain passes over two pin drums or wheels 10, journaled at opposite ends of the finger-bar 11. These drums or wheels are preferably constructed, as shown in Fig. 9, of two plates, connected by pins 12 at the corners of the plates.

To the finger-bar 11 is secured a bracket 13, through which passes a horizontal shaft 14, which is journaled in bearings 16, carried by a pivoted frame or bar 15. A shaft 17 is journaled in suitable bearings, formed in the outer end of this bracket 13 and in the knife-bar, and the inner pin wheel or drum is rigidly secured to this shaft, as is also a bevel-gear 18, with which meshes a bevel-gear 20, journaled on a stud 19 on bracket 13. A pinion 22 is preferably formed integral with the bevel-gear 20, which meshes with a driving-pinion 21, loosely mounted on shaft 14. Shaft 14 is rotated by the rod 6, with which it is connected by a universal coupling 27.

A clutch member 24, splined on shaft 14, is adapted to engage a similar clutch member 23, preferably formed integral with pinion 21. The clutch member 24 is held in engagement with clutch member 23 when the finger-bar is in a horizontal and cutting position by a bell-crank lever having one arm, 30, provided with the usual spline connection 31, with the clutch member 24, while the other arm, 29, bears against a stud or projection 28 on the bracket 13. When, however, the bar 11 is swung up, the stud 28 will be moved away from arm 29, allowing the clutch member 24 to be disengaged from pinion 21, whereby the movement of the knife-chain is stopped. The finger-bar may be raised by hand direct, or suitable levers may be provided for this purpose, as desired. A wheel 33 serves to regulate the height of the finger-bar while cutting, and the finger-bar may be raised higher to clear obstacles by a lever 36, linked to the frame 15, which is pivoted at 35.

The fingers of the knife-bar are shown at 25 with edges 38.

26 indicates a cover to prevent the chain from being displaced.

The arrow 32 indicates the direction of movement of the chain 7.

Having now described my invention, what I claim as new, and desire to secure by Letters Patent, is—

1. In combination, the finger-bar pivotally supported at its inner end, cutting means carried thereby, means for driving the cutting means located adjacent the pivoted end of the finger-bar, said means including a clutch, a clutch-shifting lever pivoted adjacent the pivoted end of the finger-bar and a projection at the pivoted end of the finger-bar to bear on the said lever, substantially as described.

2. In combination, a finger-bar pivotally supported, cutting means carried thereby, a bracket 13 at the pivoted end of the finger-bar extending upwardly and over the finger-bar, a shaft 14 passing through the bracket and serving as the pivot for the finger-bar, a drum 10 around which the cutting means passes, and a shaft therefor supported in the finger-bar and bracket 13, substantially as described.

3. In combination, a finger-bar, cutting means carried thereby, a shaft 14 about which the finger-bar pivots to be raised and lowered, drums on the finger-bar over which the cutting means passes, bevel-gearing for driving one of the drums and a pair of gears 21 22 having peripheral teeth for driving the bevel-gears, the said gear 21 being axially in line with the pivot of the finger-bar and the gear 22 being adapted to roll thereon when the finger-bar is raised and lowered, substantially as described.

4. In combination, a finger-bar, a shaft 14 about which the same pivots, a gear 21 loose on the said shaft, means for driving the shaft, a clutch on the shaft for connecting the gear 21 thereto, means for controlling the clutch located adjacent the pivoted end of the finger-bar and in turn controlled by the finger-bar, and cutting means on the finger-bar and means for driving the same from the gear 21, substantially as described.

5. In combination, a finger-bar pivoted at one end, cutting means carried by the finger-bar, driving means for the said cutting means including a clutch, a pivoted arm 29 for controlling the clutch and a projection 28 in connection with and moving with the finger-bar to move the arm 29 to set the clutch when the finger-bar is moved down, said arm 29 being operated by a part on the finger-bar when the latter is raised, substantially as described.

In witness whereof I have hereunto set my hand in presence of two witnesses.

EDVARD JENSEN WANG.

Witnesses:
RICHARD STOKKE,
AXEL ZAHN.